(12) United States Patent
Kempf

(10) Patent No.: US 10,700,883 B2
(45) Date of Patent: Jun. 30, 2020

(54) METHOD AND APPARATUS FOR TELECONFERENCING WITH MULTIPLE PARTICIPANTS

(71) Applicant: VITERO GMBH, Stuttgart (DE)

(72) Inventor: Fabian Kempf, Gerlingen (DE)

(73) Assignee: VITERO GMBH, Stuttgart (DE)

( * ) Notice: Subject to any disclaimer, the term of this patent is extended or adjusted under 35 U.S.C. 154(b) by 0 days.

(21) Appl. No.: 16/207,953

(22) Filed: Dec. 3, 2018

(65) Prior Publication Data

US 2019/0173682 A1 Jun. 6, 2019

(30) Foreign Application Priority Data

Dec. 4, 2017 (DE) .................. 10 2017 128 680

(51) Int. Cl.
*H04L 12/18* (2006.01)
*H04M 3/56* (2006.01)
(Continued)

(52) U.S. Cl.
CPC ...... *H04L 12/1818* (2013.01); *H04L 12/1822* (2013.01); *H04L 65/1089* (2013.01);
(Continued)

(58) Field of Classification Search
USPC .......................................... 348/14.01–14.09
See application file for complete search history.

(56) References Cited

U.S. PATENT DOCUMENTS 6,330,022 B1 12/2001 Seligmann
9,613,448 B1 * 4/2017 Margolin ................ G06T 11/60
(Continued)

FOREIGN PATENT DOCUMENTS

DE 102007058585 B4 5/2016

OTHER PUBLICATIONS

German Search Report from German Patent Application No. 102017128680.2, dated Aug. 14, 2018.
(Continued)

*Primary Examiner* — Maria El-Zoobi
(74) *Attorney, Agent, or Firm* — Greer, Burns & Crain, Ltd.

(57) ABSTRACT

Apparatus and method for teleconferencing with multiple participants using a computer device through which one locally present participant is connected with multiple remote participants, the computer device including one processor device and two output devices. One output device is configured as an optical display device and one output device, as an audio device. The output devices realize a conference environment for the participants. On the display device, a display area is depicted on which a conference environment is depicted and on which the participants in the teleconference are graphically represented by representatives. Through the computer device, a conference environment of an environment type is selectable from a multitude of environment types and by a command an environment type of the conference environment of the teleconference is activated to enable a teleconference with different conference environments or a teleconference with different meeting periods such as different work periods and/or relaxation periods.

21 Claims, 4 Drawing Sheets

(51) Int. Cl.
   *H04N 21/81*    (2011.01)
   *H04N 7/15*     (2006.01)
   *H04L 29/06*    (2006.01)
   *H04N 7/14*     (2006.01)

(52) U.S. Cl.
   CPC .......... *H04L 65/403* (2013.01); *H04M 3/567* (2013.01); *H04N 7/147* (2013.01); *H04N 7/152* (2013.01); *H04N 7/157* (2013.01); *H04N 21/8106* (2013.01); *H04N 21/8153* (2013.01); *H04M 2201/38* (2013.01); *H04M 2203/359* (2013.01)

(56) References Cited

U.S. PATENT DOCUMENTS

| | | | |
|---|---|---|---|
| 2002/0071026 A1 | 6/2002 | Agraharam et al. | |
| 2006/0256188 A1* | 11/2006 | Mock | H04L 29/06027 348/14.09 |
| 2010/0028846 A1* | 2/2010 | Cohen | G09B 5/06 434/323 |
| 2010/0259559 A1* | 10/2010 | Schneider | H04N 7/147 345/629 |
| 2013/0060914 A1* | 3/2013 | Callahan | G06Q 30/02 709/219 |
| 2014/0139609 A1* | 5/2014 | Lu | G10L 21/0208 348/14.03 |
| 2015/0215581 A1* | 7/2015 | Barzuza | G06T 19/006 348/14.1 |
| 2018/0173404 A1* | 6/2018 | Smith | G06F 3/04842 |
| 2019/0020699 A1* | 1/2019 | Ross | H04L 65/1093 |

OTHER PUBLICATIONS

Bouras et al., "Virtual Collaboration Spaces: The EVE Community", Proceedings of the 2003 Symposium on Applications and the Internet, IEEE (2003), pp. 48-55.

* cited by examiner

METHOD AND APPARATUS FOR TELECONFERENCING WITH MULTIPLE PARTICIPANTS

BACKGROUND

The invention relates to an apparatus and a method for teleconferencing with multiple participants wherein one or multiple remote participants are connected via a data link with at least one locally present participant for example, to discuss specific topics during teleconferencing or to study with one another or exchange notes under a moderator's management.

The prior art has disclosed a number of apparatuses and methods for teleconferencing. For example, a group of local participants may be connected with a group of remote participants via videoconference. A microphone may capture audio in the room and a camera may record video of the local participant group, transmitting these to the remote group where in turn a microphone records the audio and a camera records a video of the remote participant group so that both the local and remote groups may observe one another. The drawback of these known videoconferences is that audio recording and audio reproduction tend to show poor quality so that attending these videoconferences requires heightened concentration by the participants.

DE 10 2007 058 585 B4 discloses an apparatus and a method for teleconferencing, wherein a display device can show a graphic representation of the remote participants and the locally present participants in the teleconference. Usually, the participants are graphically grouped around a rectangular table. To identify the participants, representatives or avatars are used wherein the representative is for example depicted by a photo of the participant. The known apparatus and the known method allow satisfactory teleconferencing with lively exchanges between the local and remote participants.

Although the known apparatus and the known method allow high-quality and most satisfactory teleconferencing, real conferences whose participants can see one another in person show a number of advantages since the atmosphere is more personal and the participants tend to behave differently.

It is therefore the object of the present invention to provide an apparatus and a method for attending teleconferences with multiple participants enabling further teleconference quality improvement.

SUMMARY

A method according to the invention serves for teleconferencing with multiple participants using a computer device. At least one locally present participant is connected by means of the computer device with at least (one computer device of) one remote participant by means of a data link (remote data link). The computer device comprises at least one processor device and at least two output devices. At least one output device is configured as an (optical) display device (for graphical output) and at least one output device, as an (acoustic) audio device (for outputting acoustic signals). This allows the computer device to output optical and acoustic signals. The output devices serve to realize respectively output a conference environment for the participants, the display device illustrating a display area depicting a conference environment. The participants (the remote participants and the locally present participants) in the teleconference are graphically depicted in the display area, represented by representatives or avatars. The computer device allows selection from a plurality of environment types a (/an in particular two-dimensional, preferably not consisting of 3D models) conference environment of an environment type. A command (a specific command or a command sequence etc.) activates and/or switches an environment type of the conference environment of (in particular also during or prior to) the teleconference, for example to adapt the conference environment (prior to or in particular during) a teleconference to different conference periods such as multiple different work periods and/or relaxation periods or to enable such a teleconference and/or to enable teleconferences in various conference environments.

The method according to the invention has many advantages. A considerable advantage of the method according to the invention consists in an optical and/or acoustic adaptation of the conference environment in dependence on different meeting sections or communication objectives. This allows flexibility in adapting the conference environment to the requirements of the day. Thus, for example a relaxation period may be provided in an optically and acoustically pleasant atmosphere while, for example during a work period any acoustic background is suppressed. For example, background noises interfering with concentration may be suppressed in a suitable work period. Following an intense controversial discussion or an intense extended lecture, a different atmosphere may be intentionally chosen to provide a constructive working atmosphere. This may be achieved by a quieter atmosphere or alternately by activating the participants, depending on the situation. It is also preferred to intentionally influence the condition (e.g. awake or wide awake or tired) of the participants.

A conference environment background may be static over time periods or teleconference periods. For example, a neutral background or alternately a realistic image such as a sunset may be displayed. Also, the conference environment background may display an animated image.

The terms representative and avatar are used as synonyms in the sense of the present invention. A representative may, in particular be illustrated by a (any) symbol. It is also possible to use an abstract depiction of a person or else of an object, an animal etc., for a representative. It is also possible to use a photo or a live image for a representative. It is also possible to use a deck chair with e.g. a sun hat or for example a fish, a boat or a snowflake for a representative. Preferably, the representatives (at least if abstract) are provided with a nameplate or a preferably unique number or an in particular unique symbol.

Representatives may preferably be adapted to suit the context. In preferred specific embodiments, the depiction of the representative changes at least once during teleconferencing. The representative or the illustration of the representative is (preferably automatically) adapted respectively changed as the type of conference changes. Thus, e.g. in one teleconference period, a meeting table or a shared tray and/or a (shared) display panel may be used as a symbol for a representative, optionally showing the name and/or a photo of the participant. In another part, and in particular period of the teleconference other symbols and/or images of objects (for example of the participant) and/or a photo of a participant may be used for a representative.

A representative may change context-specific. Changing a background of the environment type and/or of the conference environment may involve changing the representative. The appearance and/or structure and/or shape of the representative may be changed. For example, in one environment type a photo may be displayed on a schematically illustrated head (or person etc.) while in another environment type a symbol labelled with the name of the participant or with a unique number is depicted. Further environment types may depict other symbols, designs, images etc. (snowflake, square, image of a salesperson, doctor etc.).

Noise or sound output is preferably context-specific. For example, an environment type in nature surroundings (mountains, ocean, lake, forest, meadow, creek or riverside, garden etc.) may offer pertaining noises (for selection) (a forest whispering, ocean surf, birds twittering etc.). An environment type of a shopping center preferably offers suitably adapted background noises. In all the configurations, it is preferred for the background sounds to be neither accidental nor random but context-specific.

The available communication tools between participants are again preferably context-specific.

In a preferred specific embodiment, two environment types differ from one another as regards the displayed optical structure and/or the output acoustic background. This allows to provide, for example in a relaxation phase, a relaxing atmosphere which may contribute to relaxing the participants and to achieve efficient exchanges between individual or multiple participants even in a relaxation phase. Adapting the conference environment to the currently prevailing situation in a relaxation phase may achieve improved focusing and/or relaxation and/or rest of the participants during such intermission so as to increase the efficiency of the teleconference on the whole. Moreover, the proper environment conditions may achieve increased user interaction in such a phase which again contributes to increased productivity.

In preferred specific embodiments, a first environment type provides a conference environment for a first type of atmosphere of the teleconference and a second environment type, a conference environment for a second type of atmosphere of the teleconference. In a first type of atmosphere, a relaxing environment may be provided while in a second type of atmosphere an environment suitable for working efficiently may be provided. It is possible to provide in a first environment type a conference environment suitable for the starting phase of a teleconference. For example, a view of a beach or an ocean view may be provided, or a virtual café or a bar or the like is depicted where the representatives of the participants may first meet informally until the teleconference officially begins.

A second environment type may provide a conference environment for a work phase involving a second type of atmosphere. Other environment types suitable for work phases are also conceivable. Further environment types suitable for a work phase in a different atmosphere and suitable to constructively achieve the targeted goals are likewise conceivable. Environment types involving types of atmosphere may be provided to support relaxation or else to stimulate exchanges between participants. For example, following an extended or complex lecture, an atmosphere in a lively environment may be selected for stimulating the participants once again.

It is possible to provide for the positions or movements of the participants' representatives to be selected or fixedly specified and/or preset or else predetermined by any of the participants.

Preferably, the second environment type or at least the second environment type of a conference environment is provided with a (shared) display panel depicted on the display device. All of the participants can perceive the display device. It is preferred for the display panel, which may be considered to be a table or a whiteboard, to be disposed centrally or in a central region of the display device. It is for example possible to dispose the participants' representatives around the display panel. Alternately, it is possible to dispose the representatives in a U arrangement around the display panel. In all the configurations, shared information may be placed or depicted on the display panel and made available to all the participants. The display panel may be semi-transparent and/or may be fit into a nature environment.

Preferably, the participants may freely position their representative or avatar in a conference environment in predefined positions. This is advantageous in all the phases of such a teleconference.

Given a conference environment of the first environment type, it is preferred for the participants to dispose their representatives in groups or to join a group as tends to happen in an actual conference e.g. prior to the start of the conference or during intermissions. This achieves more naturalness so as to increase the efficiency and acceptance of the teleconference.

In preferred specific embodiments, the first environment type is suitable for a starting phase or intermission phase or other phases or periods of a teleconference. Such a starting phase (starting period) may be given as the participants (virtually) arrive. Then, the first environment type may provide a conference environment illustrating e.g. a waiting area or a lounge area or a swimming pool or a bar. A suitable conference environment may also be depicted in intermission phases of the teleconference. Alternately, a lawn or a beach or the like may be depicted.

It is also possible to intentionally select and activate environment types involving specific types of atmosphere to take account of the currently prevailing mood in the teleconference. A (virtual) "change of environment" to another type of atmosphere may show very positive effects as regards achieving a goal.

In preferred specific embodiments, context-specific background noises (music, sounds, other noises) are output in a conference environment. In an environment of the first or another environment type, preferably context-specific background noises are output such as relaxation music or ocean surf or sea gull screams or similar noises for example upon selecting a beach or ocean environment. Alternately, music or other animal or nature noises may be output. This allows the adaptation of noise output to the depiction of the conference environment so as to enhance effects. In conference environments of the first and/or second type of atmosphere, for example an atmosphere of a walk in the woods or a conversation around a fireplace may be provided. Also, the atmosphere may be adapted by way of the background noises and/or background music from a quiet or soothing atmosphere to active or lively atmospheres or vice versa.

Preferably, the background noises may be selected. The background noises may in particular be selected context-specific.

It is preferred for each participant in (at least) one conference environment of the first environment type to be entitled to actively participate and to communicate, in particular speak, with other participants. It is possible for each of the participants to communicate and in particular speak only with participants wherein the representatives or avatars of the participants involved are disposed adjacent to one another and/or disposed in similar (or optionally adjacent) lounge areas. Adjacent preferably includes the ability of participants to speak (or communicate) with one another whose representatives are positioned in a predetermined, maximal distance from one another. It is preferred for participants to hear one another not at all or only at reduced volume (preferably less than ½ or ⅓ or ¼ or 1/10 of the volume) if their representatives are present in different lounge areas or rooms (independently of the distance between representatives). A lounge area may be formed by a (virtual) room. Alternately, a lounge area may be formed by separate seating or lounge zones within a (virtual) room.

Thus, it may be conceivable that the sound volume at which participants hear one another is dependent on the distance between the representatives. This means that the sound volume decreases with the distance increasing until the two participants can no longer perceive one another acoustically.

Alternately, it is possible to enable communication between specific groups only. For example, sub-areas may be formed in the display area. While the representatives of two users are located in the same sub-area the participants can hear one another and otherwise for example they cannot.

Preferably, all the participants can hear a participant speak in a conference environment of the second environment type. Then, in particular all the participants present in the same virtual room can hear the speaker.

In all the configurations and specific embodiments, it is preferred for a participant to be selected or predetermined as a conference manager. This may, for example be the teleconference organizer. Alternately, it is possible to select the conference manager based on his function or special status.

It is preferred for the conference manager in a conference environment of the second environment type to grant and/or revoke authorization to actively participate to a participant and/or to arbitrate a position to the representative or avatar of the participant. This is a motivating and directing function of the conference manager since he may selectively request a specific participant to participate and/or may prohibit his participation as the situation requires.

In all the configurations, it is preferred for at least one conference environment of an environment type to define on the display area a stage area and an audience area, e.g. an auditorium. With the display area showing a stage area and an audience area, it is preferred for the participants in the audience area to have no active or a reduced right to participate. Alternatively, it is possible for the conference manager to grant to a participant in the audience area an active right to participate. As a rule, though only those participants will receive an active right to participate whose representatives are disposed in the stage area. This configuration may provide, for example a panel discussion where the participants whose representatives are disposed in the stage area conduct a discussion which the participants in the audience area can hear.

In a conference environment of another environment type, it is preferred for one participant to first have the sole right to speak. Then, it is further preferred for that participant to relinquish his right to speak and to hand it over to another participant by handing over a speaker symbol to said other participant. In these configurations, it is possible for the conference manager to maintain an active right to participate at all times. Optionally, the conference manager may give or take away the active right to participate to and from all the other participants in these configurations as well.

In all the configurations and specific embodiments, it is preferred for the teleconference to be partitioned into two or more subgroups (for a predetermined or any desired time). Then, preferably each of the subgroups receives its own conference environment. Each of the conference environments of the subgroups may be identical of the same environment type. It is also possible and preferred for each of the subgroups to select its own environment type. It is also possible to predetermine the environment type for at least one subgroup of the conference environment (e.g. by the conference manager).

In all the environment types and conference environments, it is possible for a geometry of the arrangement options of the representatives to depend on the environment type. Preferably, a representative of a participant changes its shape or appearance as the environment type and/or a conference environment background changes.

The apparatus according to the invention is configured for carrying out and participating in teleconferencing with multiple participants and comprises a computer device through which at least one locally present participant can be connected with at least (one computer device of) one remote participant by means of a data link. The computer device comprises at least one processor device and at least two output devices. At least one output device is configured as a (/an optical) display device (for graphic output) and at least one output device is configured as an (acoustic) audio device (to output acoustic signals). The output devices allow realization of respectively output a conference environment for the participants.

The display device depicts a display area in which a conference environment can be depicted and in which the participants, and thus the remote participants and the locally present participants in the teleconference can be graphically represented or illustrated by representatives or avatars. The computer device allows selection of a (/an in particular two-dimensional) conference environment of an environment type from a plurality of environment types. A command (e.g. in the shape of a command pulse or a command sequence) of an input means can switch an environment type of the conference environment to enable teleconferencing including different conference environments or teleconferencing including different meeting periods, such as different work periods and/or relaxation periods.

The apparatus according to the invention also has many advantages. A considerable advantage of the apparatus according to the invention consists in the option to change the conference environment in dependence on different meeting periods so as to allow to optimally adapt the conference environment to different work periods and/or relaxation periods.

Preferably, the participants' representatives are disposed (grouped) on the display device around the display panel.

In all the configurations and specific embodiments of the apparatus according to the invention and the method according to the invention, it is preferred to provide at least one input device. At least one participant and preferably the majority of the participants (or nearly all or all of the participants) are provided with an input means to input speech and/or commands. Preferably, at least one input device is configured as a microphone device. It is preferred to have at least one (or two or three) input device(s) taken from a group of input devices comprising a keyboard device, a touchscreen, a touchpad, a computer mouse, a numeric pad, a speech or noise recognition device and the like. An input device allows a participant to express himself and to output requests and/or commands and/or signals so as to participate in or optionally control the teleconference.

A command in the sense of the present application is also understood to mean a command pulse and also a command sequence. A command may comprise one or multiple steps. Thus, during or prior to starting the application an environment type may be selected. It is also possible when finishing an application to select an environment type for the next start so as to enable changing by means of a restart.

In these configurations it is possible to prohibit any selection within the application or web page (executable file, app, internet or intranet page, browser extension such as extensions, Xtras or Plug-Ins in the browser etc.). It is possible to fixedly select the environment type prior to starting the teleconference which then cannot be changed during the teleconference.

A teleconference is understood to mean that two or preferably more (preferably remote from one another) participants communicate with one another through at least one computer device (preferably at least two computer devices) exchanging notes by means of language (and visually). The connection may be wire-bound or wireless. Any and all kinds of computer devices are conceivable, in particular PCs and mobile phones and mobile appliances and other mobile or stationary devices.

The invention provides new options in the area of teleconferencing, providing an agreeable atmosphere to the arriving participants prior to the teleconference as this is the case with actual conferences. To this end, agreeable background noise such as music or animal or nature noises may be generated.

The participants to the teleconference can suitably position their representatives or avatars and may chat and exchange information with other participants, wherein communication may be heard solely by the participants but not generally to provide privacy.

The conference manager may press a button to change the conference environment, for example to clearly separate a work phase from a relaxation phase. The participants may have different options in each period or phase of the teleconference. For example, in a relaxation phase each of the participants may position his representative in any place he desires to thus speak with the users of the adjacent representatives. Then, each of the participants may have an unrestricted right to speak. In active phases though the conference manager preferably actively manages the teleconference. As a rule, not all the participants can speak but only upon invitation.

The invention provides a customer-specific conference environment wherein contexts may be changed for different phases or periods of the teleconference.

Alternately, it is possible to provide a conference environment depicting a role play or circle of chairs or an auditorium. In an auditorium a stage area and an audience area may be provided which are then illustrated optically separate from one another.

In case that multiple display devices are used, a first monitor may show a first perspective and a second monitor, a second perspective, to display the largest possible quantity of information overall.

Further advantages and features of the present invention can be taken from the exemplary embodiment which will be discussed below with reference to the enclosed figures.

DETAILED DESCRIPTION

Figure 1:
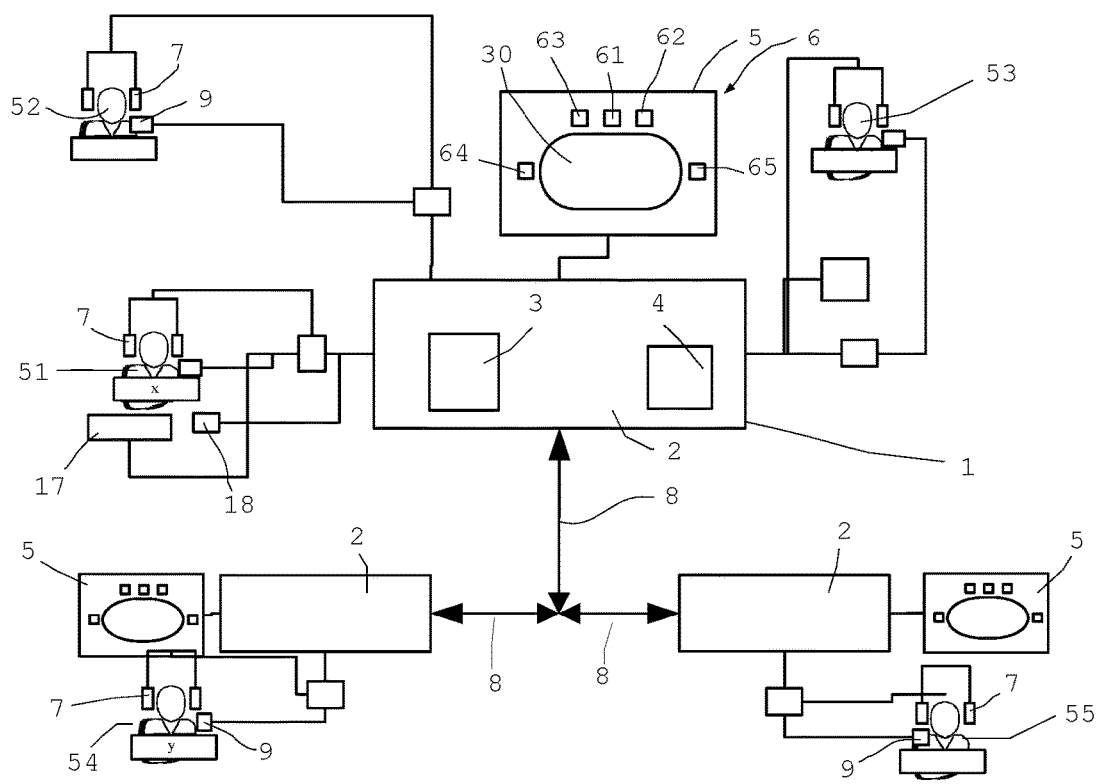
FIG. 1 a schematic view of a teleconference with local and remote participants.

FIG. 1 shows an exemplary embodiment of an apparatus 1 according to the invention for teleconferencing and participating in teleconferences in a simplistic illustration. The apparatus 1 comprises a computer device configured as a computer 2 provided with at least one processor 3 and at least one memory 4. The participants 51, 52 and 53 in this example are locally present, each wearing a headphone for an audio device 7 to hear the other participants and perceive output noises.

The output device 5 configured as a display device 6 is provided with display segments 61-65 for positioning the representatives 71-75 (cf. FIG. 2) of the participants 51-55.

The keyboard 17 and a mouse 18 and/or a touchpad or the like is assigned to this local participant 51. The display device 6 may also be touch-sensitive, suitable for inputting signals and data. This local participant 51 is the conference manager who may, for example grant the right to speak to the other participants 52-55 or take it away to ensure a structured course of the teleconference.

Remote data links 8 in this exemplary embodiment connect two remote participants 54 and 55 with the locally present participants 51-53. The participants 54 and 55, who are also remote from one another, are each provided with a complete computer 2 each including a display device 6 and keyboards and indicators, not shown. The participants 51-53 may again be positioned remote from one another.

The participants 54 and 55 wear a headphone 7 each. One microphone 9 each captures the statements from the participants 54 and 55. A speaker or a hands-free set is also possible.

Figure 2:
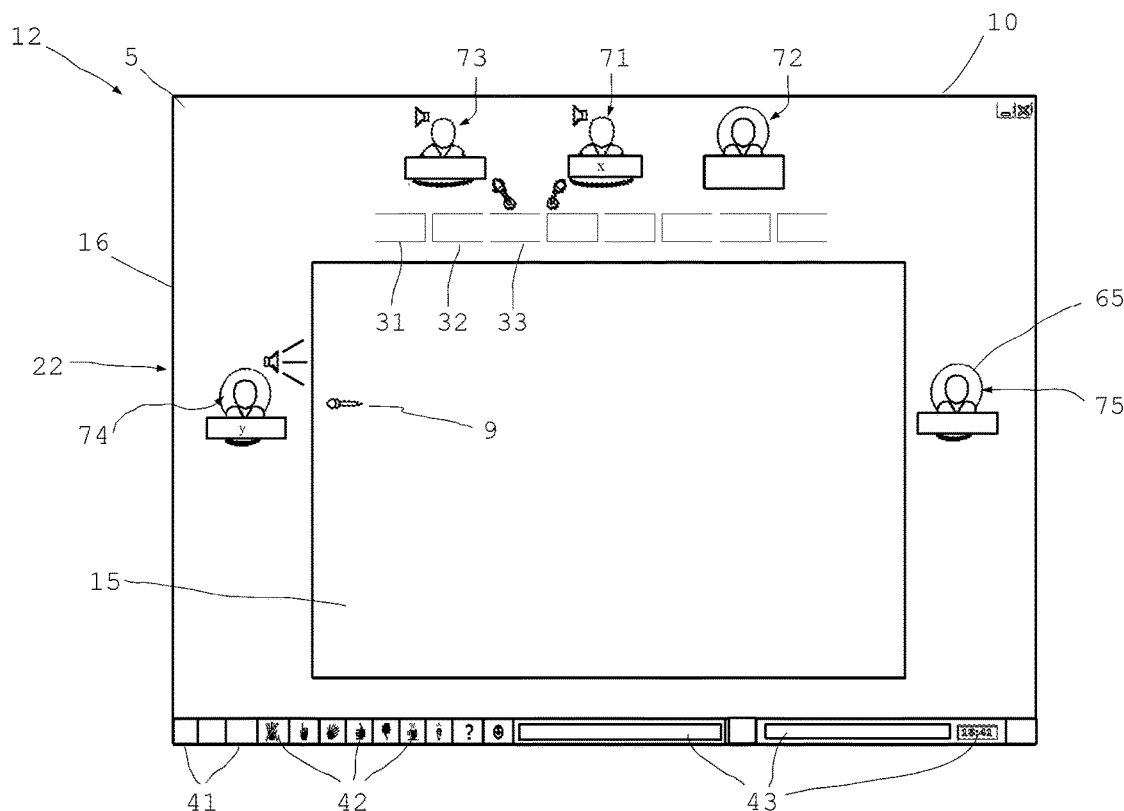
FIG. 2 a conceivable graphic output of the display device of the computer device according to FIG. 1 during a teleconference phase.

FIG. 2 shows the display area 16 of the display device 6 from FIG. 1, the representatives 71-75 of the five participants 51-55 being positioned in pertaining display segments 61-65. The display area 16 may cover the entire screen space of the display device 6 or just a section, for example a window. A photo of the participants 51-55 may for example be assigned to each of the representatives or avatars 71-75 of the participants 51-55. It is also possible to have the representatives 71-75 indicate the name of the participant concerned as is exemplarily shown for the participant 71 with the identifier "X" and for the participant 74 with the identifier "Y". Displaying a symbol, in particular if unique, or a number is likewise possible.

The participants respectively representatives 71-75 are disposed around a display panel 15 in a horseshoe arrangement. The display panel 15 may for example serve as a table on which to deposit information to be perceived and optionally processed by all the participants 71-75.

The participant 51 with the representative 71 is the conference manager who is in control of the conference. The participant 51 may speak at any time and will then be heard by all the participants.

The conference manager 51 e.g. needs to first grant the participants 52, 54 and 55 permission to speak so they can speak and be heard by everybody. Variants with all the microphones "open" where all the participants can directly speak are also possible and preferred. Alternately, a "push-to-talk" variant or the token principle is also possible. Then, the conference manager or moderator 51 gives the microphone 9 (or a token, ball, ball of wool or the like) by means of a mouse movement, swiping movement or language command, keyboard command or mouse button command or e.g. by eye tracking control to the participant concerned who can then speak as long as he has the microphone.

By operating the switches 31-33, the conference manager can initiate a number of processes or change settings such as the environment type or change the type of atmosphere or change the granting of the right to speak, e.g. from the "open" variant to "push-to-talk" or to the token principle variant etc.

The bottom edge of the display area 16 depicts a number of buttons and information areas 41-43 for outputting gestures such as consent or rejection, or to give status information such as "understood" or presence, or to call up functions or to obtain further information such as help.

FIG. 2 shows the conference environment 10 according to a second environment type 12 which stands for a second type of teleconferencing atmosphere 22 which is presently an active work period in which the participants jointly process or work out information and data on the display panel 15 or hold a team conference or the like. The second type of atmosphere 22 provides a rather Spartan atmosphere.

It is possible to have only a small part or else the actual major portion of the teleconference (or the entire teleconference) take place in a conference environment 10 according to said second environment type 12.

Prior to beginning the actual teleconferencing, each of the participants dials in the teleconference or goes online, waiting for teleconferencing to begin. Conference environments including further environment types are possible and preferred to make such waiting useful and also agreeable and to enable interchanges between each of the participants prior to the beginning of the teleconference. Thus, the FIGS. 3 and 4 show two possible variants of environment types 11 which can be arbitrated to a conference environment of a first atmosphere type 21.

Figure 3:
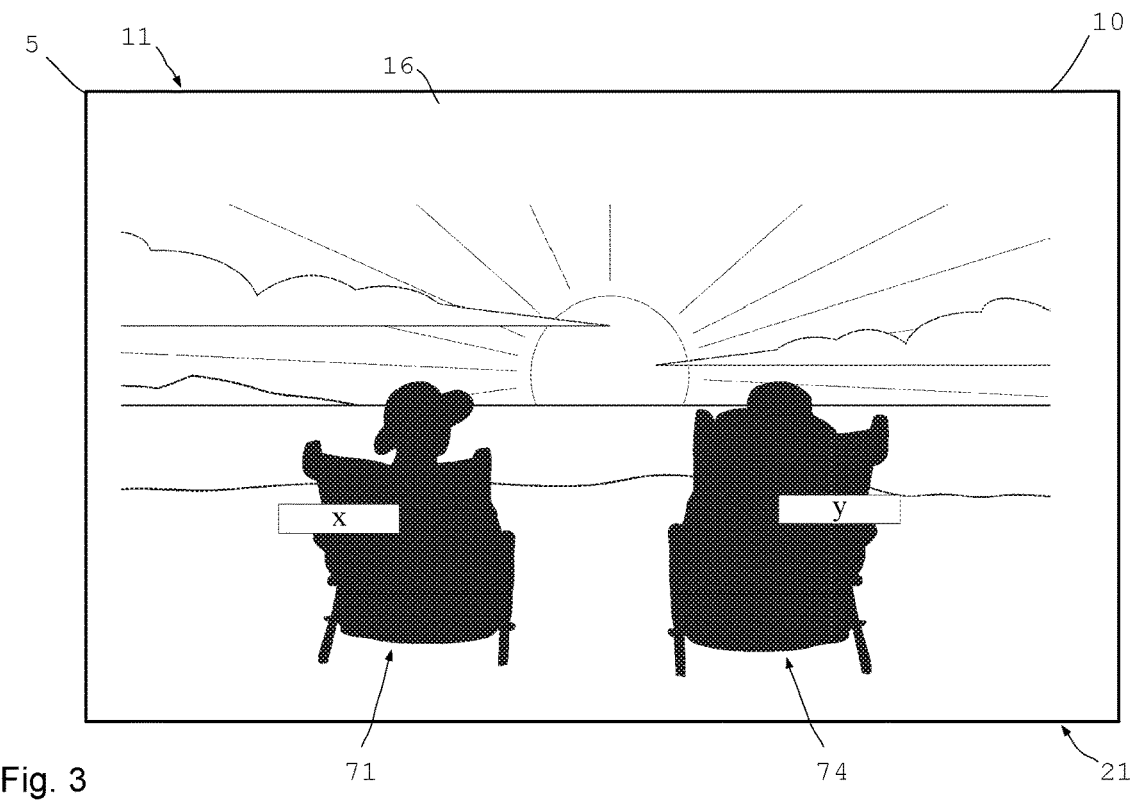
FIG. 3 a conceivable graphic output of the display device of the computer device according to FIG. 1 in a teleconference during another teleconference phase.
Figure 4:
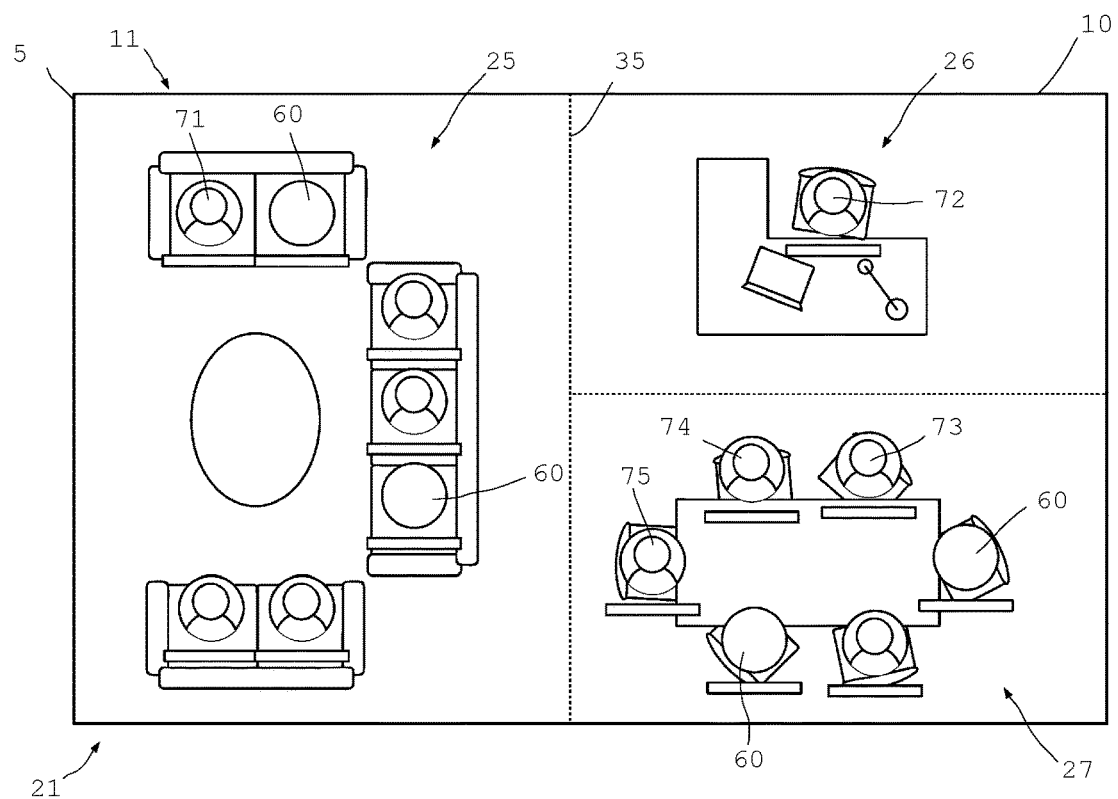
FIG. 4 a conceivable graphic output of the display device of the computer device according to FIG. 1 in a teleconference during another phase.

It is for example possible to provide prior to the beginning (or e.g. in an intermission or during another suitable period) of the teleconference proper a conference environment 10 according to a first environment type 11 as is illustrated in FIG. 3. Then, the display device 6 illustrates in the display area 16 for example a sunset on the beach, for example showing two deck chairs on each of which one representative 71 or 74 may be seated as the participant 51 or 54. Strictly speaking, the deck chairs showing sun hats are the representatives. As the environment type is changed, the representatives may be changed. Thus, e.g. in the main room a photo avatar, and then in the side room the deck chair (with or without sun hat), may serve as representative. Identification may be provided via the nameplate and/or a number and/or a symbol.

This environment type 11 showing a type of atmosphere 21 provides a quiet and contemplative atmosphere which is also suitable to close a teleconference.

FIG. 3 for example only shows a detail of the entire display area 16 so that further deck chairs are available on the beach for display segments 61-65 for the representatives 71-75. It is in particular preferred to provide a number of display segments that is higher than the number of participants in the teleconference to give each of the participants an opportunity to selectively join various groups.

FIG. 4 shows the depiction of the display area 16 of the display device 6 according to a first environment type 11, wherein three lounge areas 25, 26 and 27 are presently provided. The lounge area 26 shows a desk and a single chair on which the representative 72 of the participant 52 has sat down. Since only one single chair is available in this lounge area 26, no other participant can approach the participant 52. Thus, the participant 52 signals that he wishes to spend time alone and undisturbed for example to prepare for the imminent teleconference or to perform other actions.

Broken lines show optional walls 35 subdividing the lounge areas 25, 26 and 27 in individual spaces.

It is also possible for the participant 52 alone to change to an environment type of a conference environment e.g. during an intermission. Then the participant 52 alone views his environment and the other participants cannot see the representative 72 until they move there or determine the location in a chart.

The lounge areas 25 and 27 each provide room for multiple representatives and thus, users. Within any lounge area 25 or 27 each of the users represented by a representative can be heard by the other users whose representatives are located in the same lounge area 25 or 27. Depending on the configuration it is also possible to enable auditory exchanges between the lounge areas 25 and 27.

It is also possible for a participant having an avatar in the area 25 to hear the participants from another group or in another lounge area 26 or 27 at reduced sound volume. It is also possible to view one's own communication group in perspective in the foreground or otherwise emphasized. An auditory configuration is conceivable in which one hears the other groups (participants from other lounge areas) at reduced volume.

In other conference environments, it is also possible to provide for a first type of atmosphere 11 for example an image of a lawn or a cornfield. Other images or films are also conceivable such as an image or film of a swimming pool to provide the participants with an agreeable or stimulating or relaxing or other specific feel. The intention is to provide a specific atmosphere and/or to awaken specific feelings or to create a specific condition (e.g. awake or wide awake or tired) to benefit the communication objective.

Figure 5:
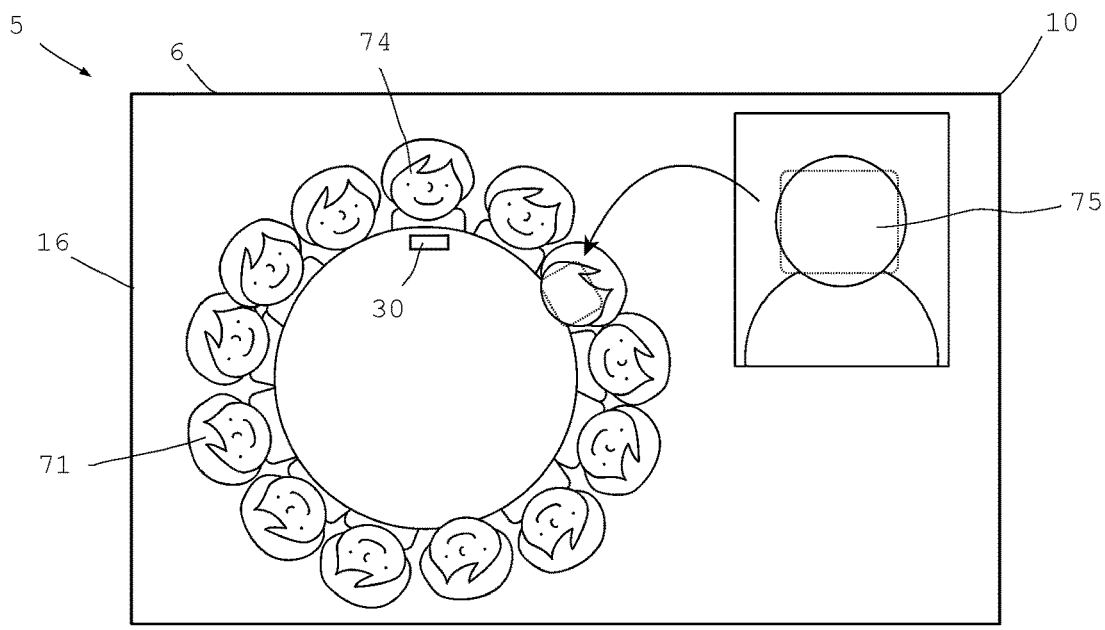
FIG. 5 a conceivable graphic output of the display device of the computer device according to FIG. 1 in a teleconference during yet another phase.

FIG. 5 shows the depiction of the display area 16 of the display device 6 for a conference environment 10 of another environment type which again represents an active phase of a teleconference. In this case, the participants are placed in a circle. It is possible to provide a token or speaker's wand 30 so that only that participant 54 is permitted to speak whose representative 74 is in possession of the speaker's wand 30. Then, the participant 54 may by means of the mouse, a touchpad or the like forward the speaker's wand 30 for example to the representative 71 so that then only the participant 51 is permitted auditory communication.

In such a phase of a teleconference which is similar to a "circle of chairs", every representative can in particular be positioned (take a seat) where the participant wishes, however only one participant can speak and can then forward the token or give the right to speak to a (any) following participant. Moderators and conference managers preferably also enjoy priority to speak.

Figure 6:
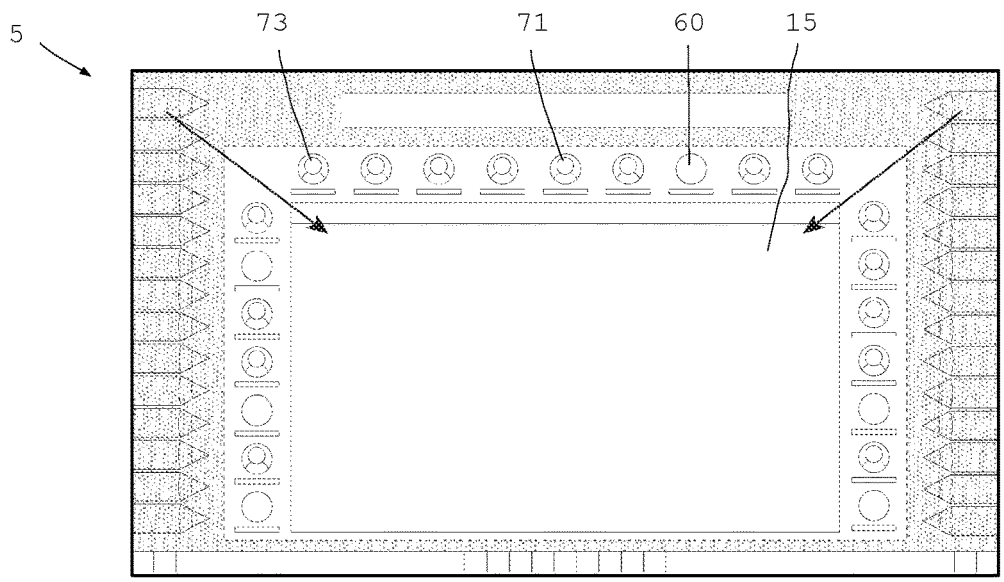
FIG. 6a variant of a conceivable graphic output of the display device regarding the illustration according to FIG. 2.

FIG. 6 shows a variant of the depiction according to FIG. 2 wherein a visual reference is established, for example to the subject matter of the teleconference or to the company's products. The example depicts a conference of a pencil manufacturer. Here, the participants can position their representative on a free seat 60 prior to the beginning of the teleconference.

Figure 7:
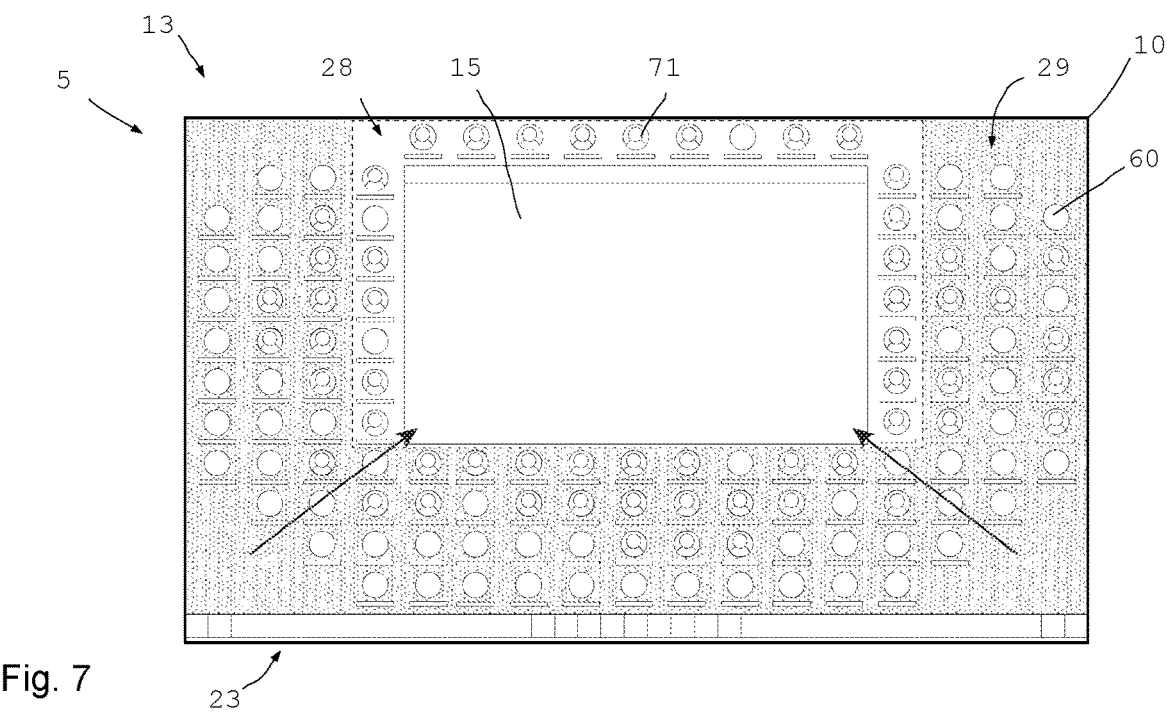
FIG. 7 a conceivable graphic output of the display device of the computer device according to FIG. 1 in a teleconference with a schematic illustration of an auditorium.

FIG. 7 shows a variant where a conference environment 10 of a third environment type 13 is illustrated simulating an auditorium with a third type of atmosphere 23. The display area 16 includes a stage area 28 and an audience area 29. In this case, the participants whose representatives are disposed in the stage area 28 may speak freely and all the participants can hear them. As a rule, the participants in the audience area 29 can only observe the performance of the participants in the stage area. However, it is possible for the participants in the audience area to be involved for example in voting. It is also possible for the conference manager (under certain conditions) to grant a participant in the audience area 29 permission to speak so that only the conference manager or else all the participants perceive what the participant concerned says.

Figure 8:
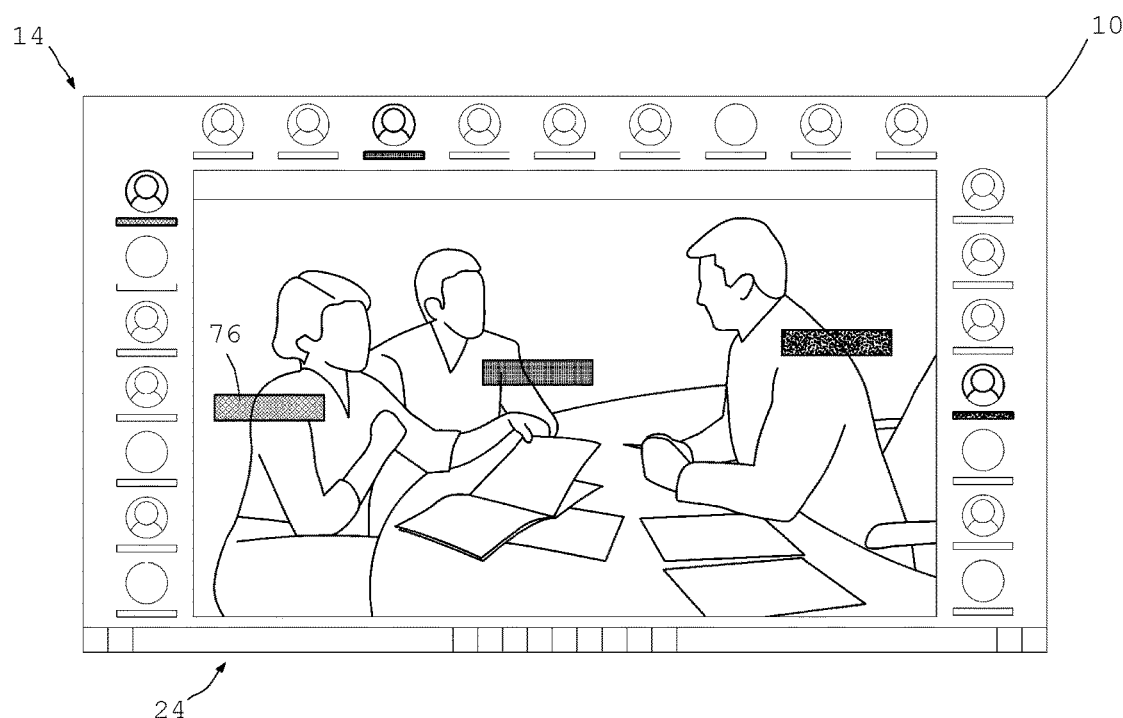
FIG. 8 another variant of the graphic output of a teleconference.

FIG. 8 shows a conference environment 10 of another environment type 14 with a type of atmosphere 24. Here, e.g. a sales talk or doctor-patient talk is simulated. The central area of the display panel 15 schematically shows the situation. The nameplates 76 of the participants involved are inserted. The representatives may additionally also be indicated in the outer area. This environment type 14 furthers imagining oneself in the environment so as to positively influence the outcome of the teleconference by means of a specific atmosphere.

Many other environment types and types of atmosphere are possible depicting e.g. everyday situations. Or else, two conference environments 10 are possible which are identical in optics and different in acoustics.

On the whole, the invention has many advantages since it provides different work environments and also relaxation environments in teleconferences so as to enable a considerably more natural course of a teleconference. Thus, the participants in teleconferencing may meet prior to beginning the active phase of teleconferencing in an environment of the first type of atmosphere 21 for (virtual) interchanges in a conference environment 10 of a first environment type 11 as it is the case in actual conferences. In the same way, a conference environment according to a first environment type may be provided in an intermission of the teleconference to enable relaxed exchanges in small groups and clusters.

At the beginning of teleconferencing, switching to a second environment type 12 is possible which generates a different atmosphere. As required or at specified intervals, the environment type and the type of atmosphere may be shifted to take acute requirements into account.

The conference environments of the pertaining environment types may be processed optically and acoustically. For example, relaxation music may be played in a relaxation phase or animal noises or nature noises may be played to enable a most agreeable atmosphere for the participants.

A considerable advantage in all the variants is that the arrangement and arrangement options of the representatives may show context-specific differences. Thus, given an environment type with a prevailing beach atmosphere, a different arrangement (e.g. in rows with an ocean view) of the representatives may be possible compared to a classic variant with a conference table in the center. This opens up new options. The geometry of the arrangement options of the representatives preferably depends on the environment type.

While a particular embodiment of the present method and apparatus for teleconferencing with multiple participants has been described herein, it will be appreciated by those skilled in the art that changes and modifications may be made thereto without departing from the invention in its broader aspects and as set forth in the following claims.

| List of reference numerals: | |
|---|---|
| 1 | apparatus |
| 2 | computer, computer device |
| 3 | processor device |
| 4 | memory device |
| 5 | output device |
| 6 | display device |
| 7 | audio device, speaker, headphone |
| 8 | remote data link |
| 9 | microphone |
| 10 | conference environment |
| 11 | first environment type |
| 12 | second environment type |
| 13 | third environment type |
| 14 | further environment type |
| 15 | display panel |
| 16 | display area |
| 17 | keyboard |
| 18 | mouse |
| 21 | first atmosphere type |
| 22 | second atmosphere type |
| 24 | fourth atmosphere type |
| 25-27 | lounge area |
| 28 | stage area |
| 29 | audience area |
| 30 | speaker's wand |
| 31-33 | switch |
| 35 | wall |
| 41-42 | button |
| 43 | text field, information field |
| 51-55 | participant |
| 60 | free space |
| 61-65 | display segment |
| 71-75 | representative, avatar |
| 76 | nameplate |

The invention claimed is:

1. A method for teleconferencing with multiple participants using a computer device through which at least one locally present participant can be connected with at least one remote participant by means of a data link, the computer device comprising at least one processor device and at least two output devices, at least one of the output devices being configured as a display device and at least one of the output devices, as an audio device, wherein the output devices generate a displayed conference environment for the participants, said displayed conference environment displaying a selected optical and/or acoustic background, wherein the display device depicts a display area on which a conference environment is depicted and on which the participants in the teleconference are graphically represented by representatives, the method comprising:

by means of the computer device, a conference environment of an environment type is selected by a user from a multitude of said optical and/or acoustic background environment types and is activated to enable teleconferencing with various conference environments or a teleconference with a selected meeting time period; and wherein a geometry of the arrangement options of the representatives depends on the selected environment type.

2. The method according to claim 1, wherein a first environment type provides a conference environment for a first type of teleconference atmosphere, and a second environment type provides a conference environment for a second type of teleconference atmosphere.

3. The method according to claim 2, wherein at least in the second environment type of a conference environment a display panel is depicted on the display device and is viewable by all the participants.

4. The method according to claim 2, wherein in a conference environment of the first environment type, the participants can position their representatives in pre-defined positions.

5. The method according to claim 2, wherein the first environment type is suitable for one of a starting phase, an intermission phase and a teleconference activating phase.

6. The method according to claim 2, wherein in a conference environment of the first environment type, context-specific background noises are at least one of relaxation music, ocean surfer and sea gull screams in a conference environment providing a beach atmosphere.

7. The method according to claim 1, wherein the background noises are selected by the user.

8. The method according to claim 7, wherein the background noises are context-specific.

9. The method according to claim 2, wherein in a conference environment of the first environment type, each participant is entitled to actively participate and can speak with other participants.

10. The method according to claim 2, wherein in a conference environment of the first environment type, each participant can only speak with participants, while the representatives of the participants concerned are arranged adjacent to one another or in the same lounge area, and/or wherein in a conference environment of the first environment type each participant hears participants at reduced volume, while the representatives of the participants concerned are arranged in another lounge area.

11. The method according to claim 1, wherein one participant is selected or predetermined as the conference manager.

12. The method according to claim 11, wherein the conference manager in the second environment type may give to, or take away from, a participant the right to actively participate and/or can arbitrate a position to the representative of the participant.

13. The method according to claim 1, wherein a stage area and an audience area are displayed on the display area.

14. The method according to claim 1, wherein in another environment type, one participant has the sole right to speak and relinquishes his own right to speak to another participant by arbitrating a speaker symbol, handing it over to the other participant.

15. The method according to claim 1, wherein the teleconference is subdivided in two or more subgroups and each of the subgroups receives its own conference environment.

16. The method according to claim 15, wherein at least one subgroup can select the environment type of the conference environment.

17. The method according to claim 1, wherein at least one representative of a participant is changed in its shape or appearance as the environment type and/or a conference environment background is changed.

18. The method according to claim 1, wherein a participant is provided with different communication tools in conference environments of different environment types.

19. The method according to claim 1, wherein the representative is additionally depicted on the display panel.

20. An apparatus for teleconferencing and participating in teleconferences with multiple participants, comprising:
   a computer device, through which at least one locally present participant can be connected with at least one remote participant by means of a data link, the computer device comprising at least one processor device and at least two output devices;
   at least one of which output devices is configured as a display device and at least one of which output devices, as an audio device;
   wherein the output devices can realize a conference environment for the participants; wherein the display device depicts a display area on which a conference environment can be depicted and on which the participants in the teleconference can be graphically represented by representatives;
   by means of the computer device a conference environment of an environment type is selected by a user from a multitude of environment types using an input device, an environment type of the conference environment is activated to enable at least one of teleconferencing involving different displayed conference environments and different meeting periods; and
   wherein a geometry of the arrangement options of the representatives depends on the environment type.

21. The apparatus according to claim 1, wherein the representatives of the participants are arranged on the display device around the display panel.

* * * * *